UNITED STATES PATENT OFFICE.

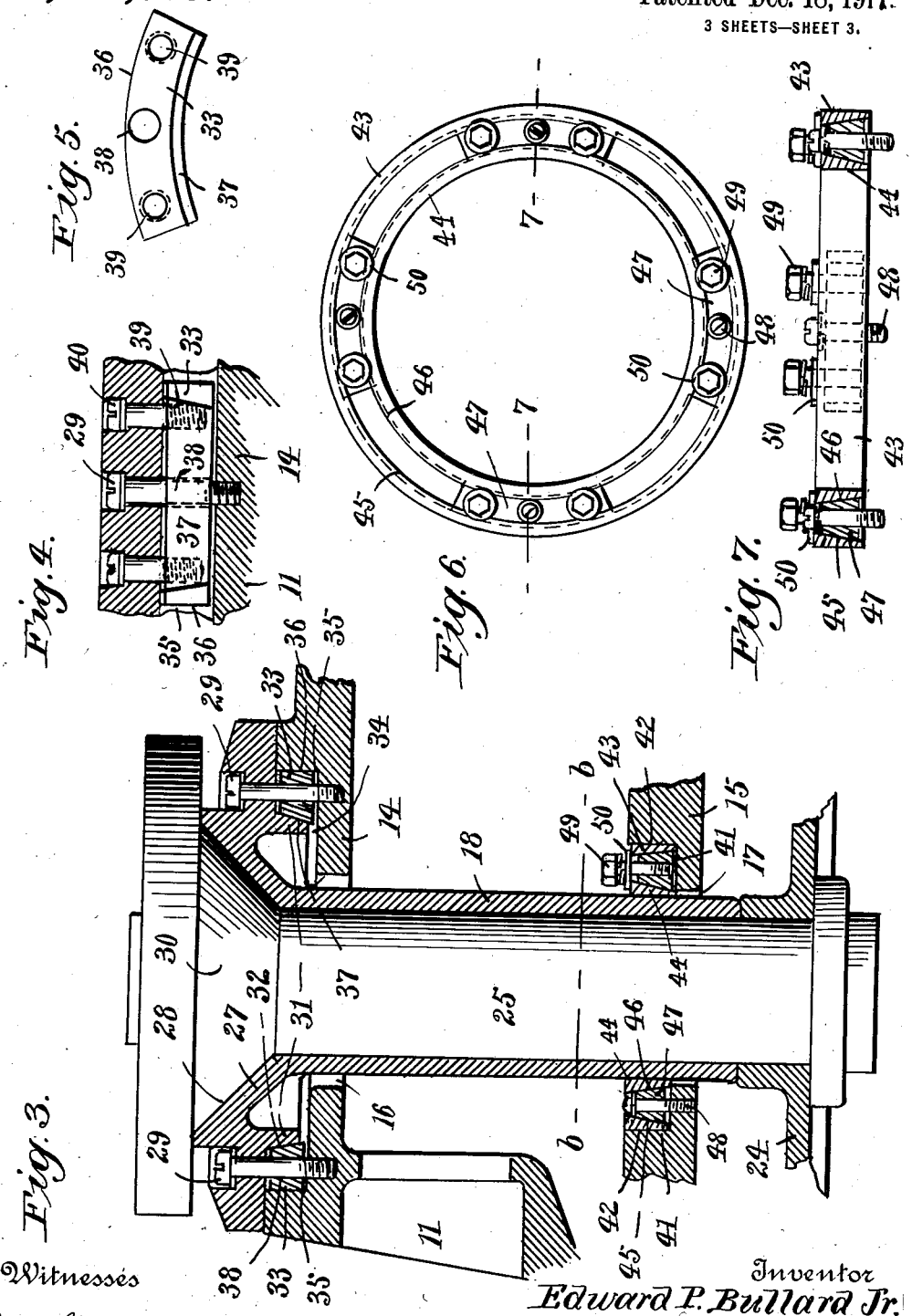

EDWARD P. BULLARD, JR., AND WILLIAM N. STEVENS, OF BRIDGEPORT, CONNECTICUT, ASSIGNORS TO THE BULLARD MACHINE TOOL COMPANY, OF BRIDGEPORT, CONNECTICUT, A CORPORATION OF CONNECTICUT.

WORK-SPINDLE ADJUSTMENT.

1,250,556.  Specification of Letters Patent.  Patented Dec. 18, 1917.

Application filed March 25, 1916. Serial No. 86,601.

*To all whom it may concern:*

Be it known that we, EDWARD P. BULLARD, Jr., and WILLIAM N. STEVENS, citizens of the United States, and residents of Bridgeport, in the county of Fairfield and State of Connecticut, have invented certain new and useful Improvements in Work-Spindle Adjustments, of which the following is a specification.

Our invention relates to new and useful improvements in machine tools of the multiple spindle type, such for instance as is shown and described in our prior patent application filed January 14, 1914, and which we have termed a "multaumatic" machine.

This type of machine includes a series of rotatable work carrying spindles which are mounted in a rotary carrier and whereby the rotatable spindles are moved with the carrier from one position to another and beneath sets of cutting tools, not shown. These tools are carried upon tool slides mounted upon a swivel which can be swiveled in any direction and are in turn carried on slides having a vertical movement to advance and return the tools to and from the work holding spindle.

These work carrying spindles are arranged in the carrier at an equal distance apart one from the other and are likewise arranged at a uniform radial distance from the axis of rotation of the carrier. It is highly important that this condition of position should be perfectly accurate so that the different spindles will properly register and coöperate in their working functions with the cutters whose slides are positioned above. Each of these work carrying tables is provided with a vertically disposed spindle that extends down into the carrier and is provided with operative connections whereby it is driven. The spindles are directly mounted in suitable cylindrical bearings to insure the free and accurate operation of the tables upon the carrier.

It is therefore the purpose of our invention to provide a reliable means of adjusting the tables, their spindles and bearings within the carrier with relation to each other and to and from the axis upon which the carrier operates, and further to provide means for adjusting the two end portions of the spindle bearings independently if need be, but as before stated with reliable exactness so that the same may be accurately positioned in a true vertical position and likewise at an equal distance apart.

With the above objects in view the invention further resides and consists in the novel construction shown upon the accompanying three sheets of drawings forming a part of this specification upon which similar characters of reference will be found to designate like or corresponding parts throughout the several figures and of which Figure 1 shows a central vertical cross section through the lower portion of a rotary carrier of a multiple spindle machine provided with our novel form of table spindle adjusting devices.

Fig. 3 shows upon an enlarged scale, a central vertical section of one of the spindle bearings and adjusting device therefor illustrated in the preceding figures.

Fig. 4 is a vertical sectional view through the carrier, spindle bearing and adjusting device therebetween.

Fig. 5 shows a detached plan view of the adjusting block shown in Fig. 4.

Fig. 6 is a detached plan view of the adjusting rings and blocks employed around the lower portion of the spindle bearings, and Fig. 7 is a central vertical cross section through the lower adjusting rings taken on line 7—7 of Fig. 6.

Figure 1:
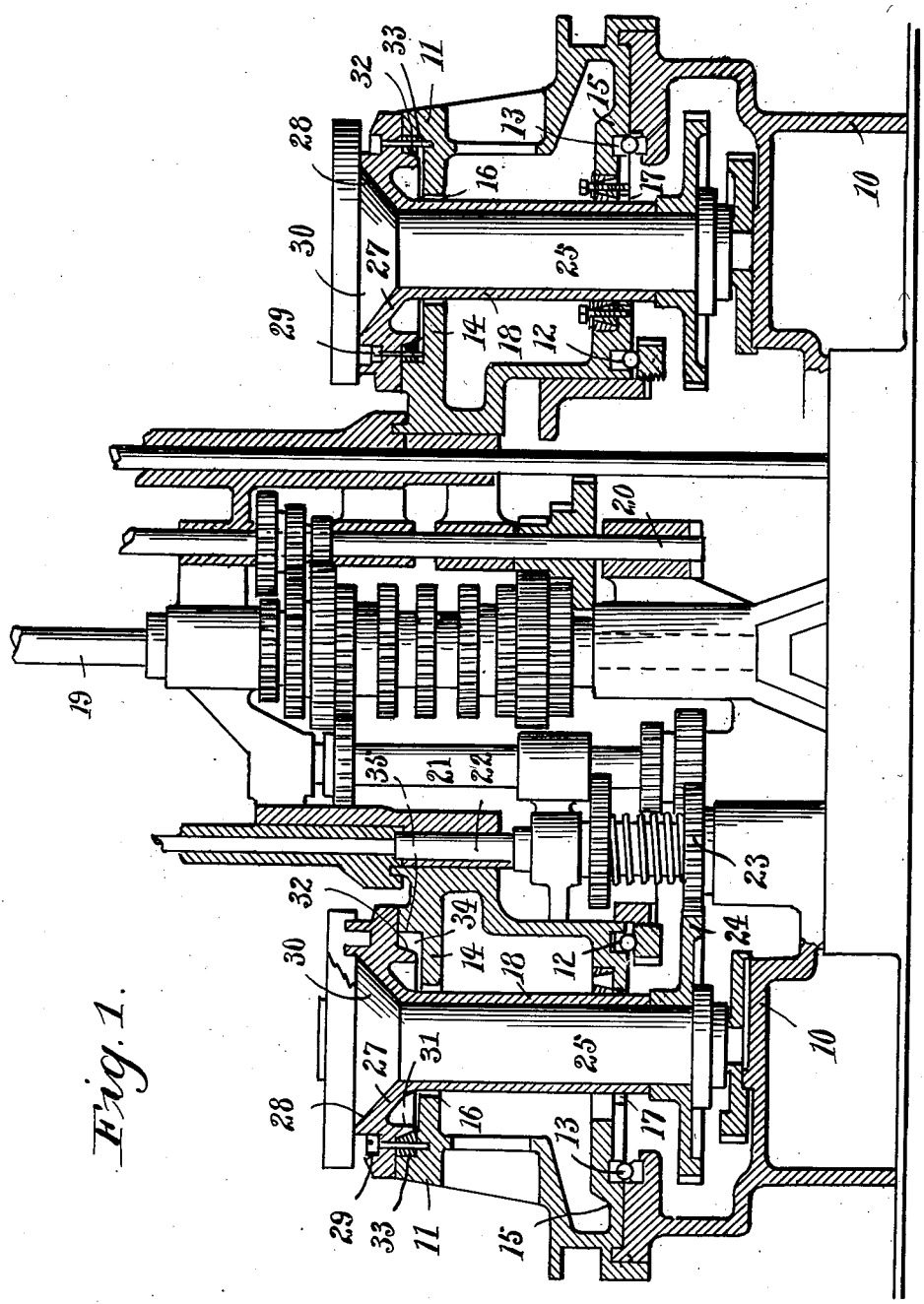

Referring further to the characters of reference marked upon the drawings 10 represents the base of a multiple spindle machine and 11 a rotatable carrier mounted upon said base and which is adapted to be rotated from time to time to move the tables to their various operative positions. The carrier is preferably designed to rest upon an inner and outer series of ball bearings 12 and 13 as shown in Fig. 1, and includes a frame the intermediate portion of which is hollow between the upper wall 14 and the lower wall 15. The upper wall is provided with a series of opening or holes 16 that aline with a similar series 17 in the lower wall. These alined holes serve to receive the spindle bearing 18 which will later be referred to.

19 indicates a driving shaft through which both the carrier and tables may be operated. This shaft is provided with a series of gears including several trains, as shown, for operating the intermediate shafts 20, 21 and 22. A gear 23 upon the last named shaft meshes with and drives a gear 24 secured to the table spindle 25 journaled in the before mentioned spindle bearing 18. The sliding gear 23 is adapted to be connected and disconnected with the gear 22 so as to operate the latter only while the carrier is standing still and for the rotation of the tables.

The foregoing brief description of the construction of the machine is to illustrate one form of machine to which our invention may be applied. The invention, however, can be employed to advantage on most any form of multiple spindle machine wherein a rotatable base or carrier is used and contains a series of work carrying tables that must be accurately spaced one from the other and whereby means should be provided for adjusting their positions from time to time to maintain their proper positions.

Figure 2:
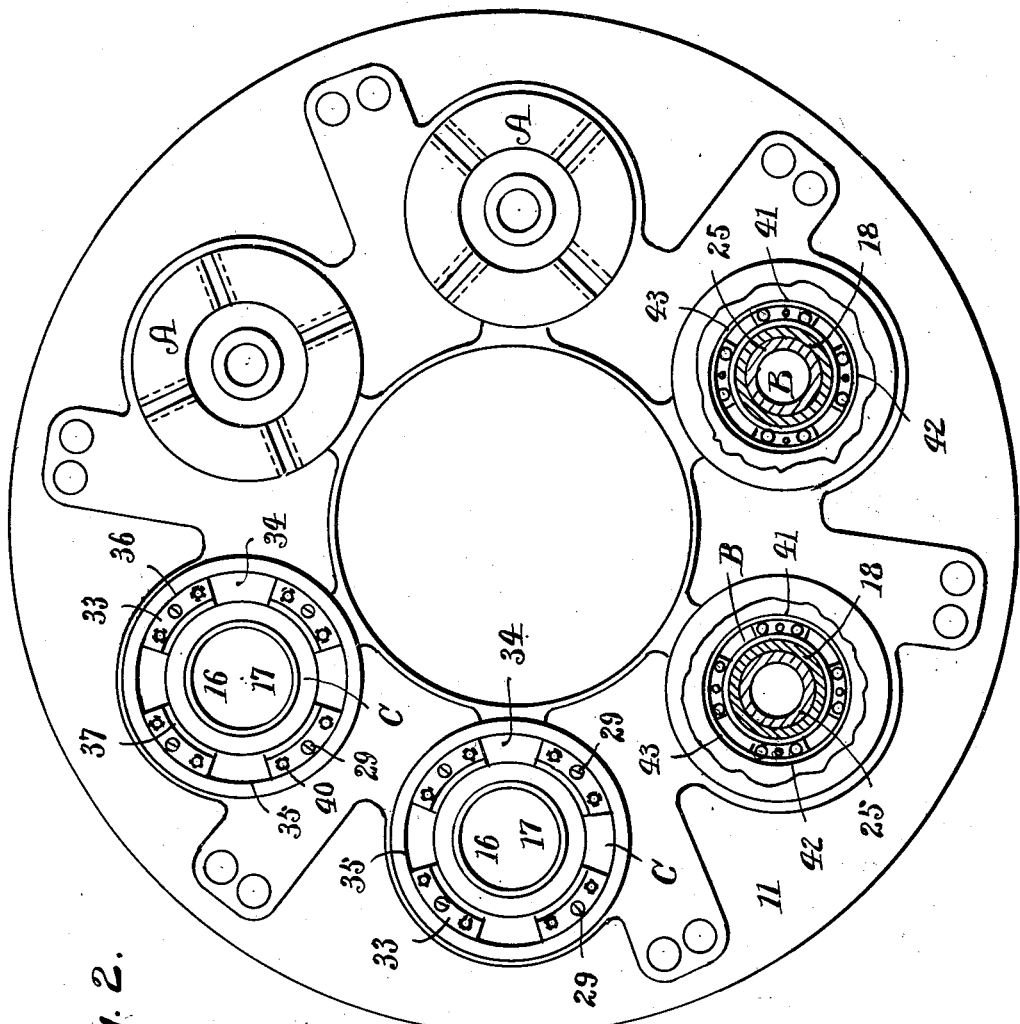
Fig. 2 is a plan view of the rotary carrier shown in Fig. 1 and having a series of table spindles mounted therein and fitted with our improvements.

The machine illustrated in Figs. 1 and 2 shows a series of six table spindles and bearings, the constructions of which are alike including the same form of adjusting mechanisms. The same form of table, spindle and bearing is shown on a somewhat larger scale in Fig. 3 to better illustrate the adjusting devices therefor. This construction of adjusting device might, however, be varied to a degree without departing from the spirit of the invention as the improvements and advantages of these adjustable spindles as applied to a machine of this sort, resides largely in the fact that they are mounted in series in a common carrier and are adjustable with relation to each other so as to accurately position them, thus differing from an individual shaft or spindle bearing which might possibly be mounted in a fixed base or hanger without relation to a rotary carrier or a second spindle with which it must coöperate.

In Fig. 2 the carrier is shown in plan and as before suggested accommodates six tables 26, two of which are shown in plan view at A—A and two more and their spindles in section as indicated by B—B and taken on line b—b of Fig. 3. The other two stations C—C of the carrier show both the table and spindle bearings removed to better illustrate the upper series of adjustable blocks against which the spindle bearings are mounted.

As before stated the several spindle bearings 18 are of a cylindrical form and have a flanged top end portion 27 in which is formed a conical bearing surface 28. These bearings 18 are supported vertically in the carrier and extend down through the before mentioned holes 16 and 17 of the carrier and in which they are adjustably secured. The flanged part 27 of the spindle bearings rest upon the top 14 of the carrier and are adjustably secured thereto by screws 29 as will again be referred to.

The work carrying tables 26 include an under tapered bearing surface 30 that is shaped to conform to the conical bearing surface 28 of the spindle bearing that operates in it and is further provided with a depending flange 31 the outer side 32 of which is tapered as shown to form a shoulder against which the several adjusting blocks 33 are set.

Surrounding the top end of each of the holes 16 in the top 14 of the carrier 11 is formed a countersink 34 having a vertical annular outer side wall 35 that forms an annular shoulder against which the before mentioned adjusting blocks 33 are seated.

We have preferably shown four of these adjusting blocks 33 which are circularly arranged at an equal distance one from another and like their adjusting devices are preferably all of a similar construction. Each block includes one straight outer side wall 36 that rests against the outer annular wall 35 and an inner tapered side 37 that movably fits against the annular tapered side 32 of the flange 31. A hole 38 extends down through the central portion of the blocks 33 to loosely accommodate the before mentioned screw 29 mounted in the flange of the spindle bearing and seated in the upper wall 14 of the carriage. These blocks are further provided with tapped holes 39 in the top of each end portion to receive the threaded end of the adjusting screws 40 that are rotatably mounted in the flange 31 of the spindle bearing and threadably seated in each end portion of the block so as to draw the same up and cause this bevel edge to operate against the bevel side wall 32 of the flange 31 in a manner to shove the table spindle bearing over.

In order to accomplish the adjustment of the table in the manner just described it would first be necesary to loosen up on the screw and block on the opposite side of the table to a sufficient extent to permit the spindle to be shifted. The adjusting blocks are so arranged that the operation of the two or possibly three would shift the table to and from the center of the carrier, while the adjustment of the two others would shift the spindle to or from the adjacent spindles. It will therefore be seen that the opposite blocks must be adjusted with relation to each other one being drawn up while the other is lowered and vice versa, if the table is to be moved in an opposite direction.

The foregoing adjusting devices as will be seen serve to adjust the upper end portion of the spindle bearings, while the lower part of the bearing is taken care of by a separate set of devices of a somewhat similar character, as will next be described.

A shouldered recess 41 is formed in the lower wall of the carrier and around the hole 17 that forms a vertical annular wall 42 against which a ring 43 is seated. A second ring 44 is fitted upon the outer periphery of the spindle bearing inside of the before mentioned ring 43. The inner wall 45 of the outer ring and the outer wall 46 of the inner ring are both tapered in a manner to form an annular pocket therebetween that is wider through its bottom portion than its top. Between these two tapered walls are arranged a series of wedges 47 that are designed to be adjusted vertically by means of screws 48 and 49. The center screw 48 passes freely through the wedge and is seated in the carrier so as to serve to draw the same down, while the other two screws 49 pass through a washer 50 that rests upon the rings, and threadably engages the wedges so that the same can be drawn up against the tapered sides of the rings to shift the inner ring. Thus it will be seen that by the proper operation of the two sets of screws, the wedges may be raised and lowered and by raising the wedge or wedges upon one side and lowering them upon the other the table spindle may be shifted as desired and then by tightening up on the several pairs of screws 49 the bearing can be firmly secured in position.

Having thus described our invention what we claim and desire to secure by Letters Patent is:—

1. The combination with a base, a rotary carrier mounted thereon, a series of spindle bearings mounted in the carrier, means for adjusting the bearings toward and from each other and to and from the axis of rotation of the carrier.

2. The combination with a base, a rotary carrier mounted thereon, a series of cylindrical bearings mounted in the carrier, means for adjusting the bearings toward and from each other and to and from the axis of rotation of the carrier, and rotary work carrying tables mounted on the carrier and having spindles extended into the bearings.

3. The combination with a base, a rotatable carrier mounted thereon, a series of rotary work carrying spindles mounted thereon, means for adjusting the upper end portion of the spindles toward and from each other and to and from the center of the axis of rotation of the carrier.

4. The combination with a base, a rotatable carrier mounted thereon, a series of rotary work tables having spindles extending into the carrier parallel with its axis, means for adjusting the lower end portion of the spindles and tables sidewise toward and from each other and to and from the axis of rotation of the carrier.

5. In a multiple spindle machine, the combination with a rotary carrier, of a series of spindle bearings, table spindles mounted in the bearings, means interposed between the carrier and bearings for adjusting the latter with relation to each other and the axis of the carrier.

6. The combination with a base, a rotatable carrier mounted thereon, a series of spindle bearings mounted therein, separate means for adjusting the two end portions of the bearings in sidewise directions and to and from the center of the axis of the carrier.

7. The combination with a base, a rotatable carrier mounted thereon, a series of spindle bearings mounted in the carrier, means for adjusting the upper end portion of the bearings sidewise parallel with the axis of the carrier and toward and from each other and separate means for similarly, but independently adjusting the lower end portion of the bearings.

8. The combination with a carrier, of a spindle bearing mounted therein, means for adjusting the bearing laterally and comprising tapered blocks arranged around the sides of the bearing, and means for adjusting the blocks to shift the bearings sidewise.

9. The combination with a carrier, of a spindle bearing mounted therein, a ring seated in the carrier, a smaller ring seated against the bearing, blocks arranged between the rings and means for adjusting the blocks to shift the bearing.

10. The combination with a carrier having an annular shoulder, of a spindle bearing having an annular flange within the annular shoulder, blocks arranged between the shoulder and flange, and means for adjusting the blocks to shift the bearing.

11. The combination with a rotatable carrier, of a plurality of work carrying spindles mounted to revolve around the axis of the carrier and also having a revolving movement on their axis, means for accurately adjusting the spindles with relation to the axis of each other and that of the carrier.

Signed at Bridgeport, in the county of Fairfield and State of Connecticut this 15th day of March, A. D. 1916.

EDWARD P. BULLARD, Jr.
WILLIAM N. STEVENS.

Witnesses:
W. J. LYNCH,
J. D. McLEOD.